(No Model.) 2 Sheets—Sheet 1.
G. W. SCHERMERHORN.
BOAT.
No. 429,649. Patented June 10, 1890.
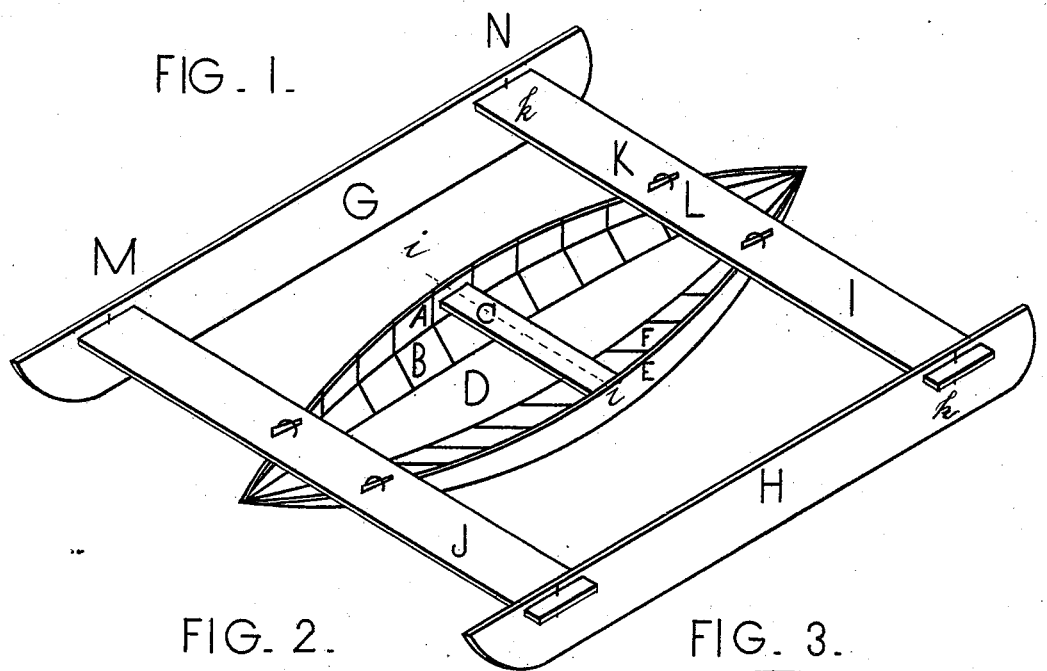
WITNESSES:
Geo. B. Vanneman
Geo. N. Hammond
INVENTOR:
George W. Schermerhorn (No Model.) 2 Sheets—Sheet 2.

G. W. SCHERMERHORN.
BOAT.

No. 429,649. Patented June 10, 1890.

WITNESSES:
Geo. B. Vanneman
Geo. N. Hammond

INVENTOR
George W. Schermerhorn

UNITED STATES PATENT OFFICE.

GEORGE W. SCHERMERHORN, OF PHILADELPHIA, PENNSYLVANIA.

BOAT.

SPECIFICATION forming part of Letters Patent No. 429,649, dated June 10, 1890.

Application filed December 11, 1889. Serial No. 333,382. (No model.)

*To all whom it may concern:*

Be it known that I, GEORGE W. SCHERMERHORN, a citizen of the United States, residing at No. 231 Pine street, Philadelphia, in the county of Philadelphia and State of Pennsylvania, have invented a new and useful Folding Flexible Wooden Boat, of which the following is a specification.

My invention relates to improvements in folding boats in which the body or hull of the boat is formed of flexible boards or planks hinged or lashed together in such a way that they may be easily and quickly closed up into compact form or they may be easily and quickly expanded so as to form a boat; and in conjunction with a water-tight packing in the hinged or lashed joints, or a covering of the joints with a strip of canvas, so that this canvas or packing may be so attached as to not only form a water-tight joint, but it may also form the hinge to hold the boards together or cover the whole boat with a canvas cover; and also to furnish a portable boat with outriggers, which may be readily attached and detached, and for the purpose of giving the boat more stability and also to prevent the boat from making leeway when under sail on a wind. The boat can be used with or without the outriggers, as occasion may require; and the objects of my improvement are, first, to provide a first-class wooden boat that may be expanded when in use or that may be closed up when not in use; second, to furnish a portable boat with portable outriggers, for the purpose of giving the boat stability, and also to prevent the boat from making leeway. I attain these objects by the mechanism illustrated in the accompanying drawings, in which—

Figure 13:
Figure 14:
Figure 15:
Figure 16:
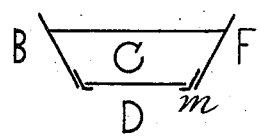
Figure 17:
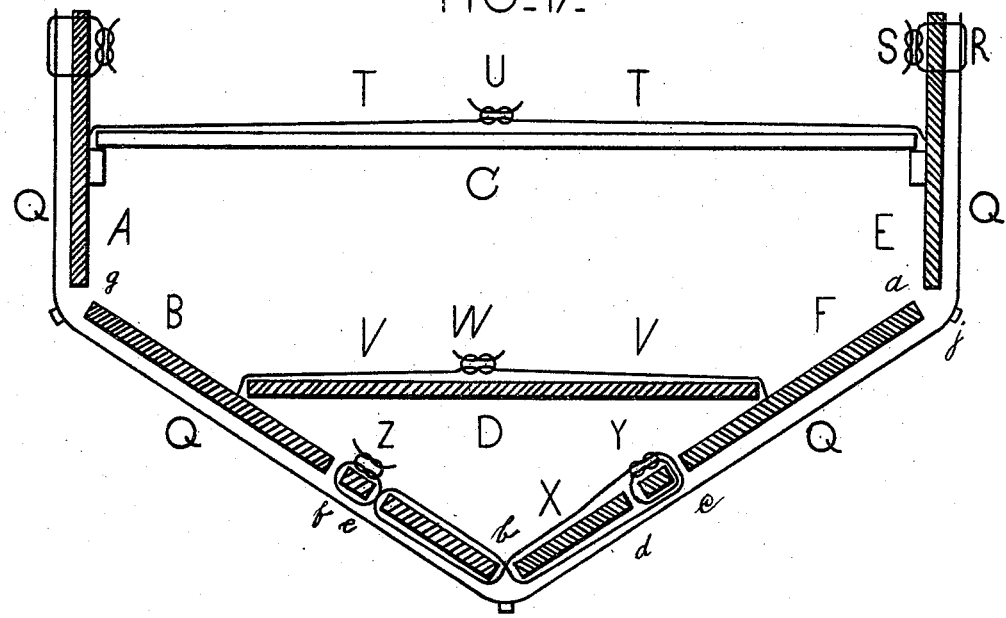

Figure 1 is a perspective view of the boat expanded with the outriggers attached. Fig. 2 is one of the flexible boards of which the hull of the boat is composed, of which there are two A and E. Fig. 3 is one of the flexible boards of which the hull is constructed, of which there are also two B and F. Fig. 4 is the false bottom or floor of the boat. Fig. 5 is the fore and aft part of the outrigger, of which there are two G and H. Fig. 6 is the thwart-ship part of the outrigger, of which there are two I and J. Fig. 7 is a side view of the hull or body of the boat when closed or collapsed. Fig. 8 is an edge view of the hull or body of the boat when closed. Figs. 9, 10, 11, 12, 13, 14, and 15 show a cross-section taken at the dotted line *i* in Fig. 1, and shows the different positions of the boat as it is gradually closed up. Fig. 16 is a cross-section taken at the dotted line *i* in Fig. 1, and shows the boat constructed so as to contain only three flexible boards instead of four or five, as is shown in the other figures. Fig. 17 is an enlarged cross-section taken at the dotted line *i* in Fig. 1, and shows the construction in detail.

Similar letters refer to similar parts throughout the several views.

The flexible boards A, B, E, and F form the hull or body of the boat. The lower edge of A is fastened to the upper edge of B, and the lower edge of E is fastened to the upper edge of F, and the two lower edges of B and F are fastened together, and these three joints are formed by putting a sufficient number of the lashings X in each joint, or by hanging them together with any suitable hinge.

In the bottom of the boat is placed the board D, which forms a floor or false bottom, and the rope or straps V serve to hold it in place.

The flexible boards A and E are in the form of the segment of a circle—that is, the lower edge of each is the arc of a circle, and the upper edge is the chord of the arc, as is shown in Fig. 2—while the flexible boards B and F have the arc of a circle for both their upper and lower edges, as is shown in Fig. 3; but the form of all these boards can be varied so as to produce a boat of the desired model and dimensions.

The boards A, B, E, and F and the bottom-board D have cleats or timbers fastened across them to strengthen them and prevent them from splitting, as is shown in Figs. 1, 2, and 3. Between the boards A and E is placed the thwart or seat C, which holds the boat open and in position for use.

There are four beckets or loops K, attached to the upper edge or gunwale of the boat, which pass up through the mortises O and P in the thwart-ship parts of the outriggers I and J, and the outriggers I and J are held firmly in place by driving the fids or keys L through the beckets or loops K, and the fore and aft parts of the outriggers G and H are attached to the thwart-ship parts I and J by putting the ends of I and J through the mortises M and N, as is shown in Fig. 1, and they are held in place by the pins *k*.

Rowlocks may be placed upon the upper edges of the outriggers G and H, and the outriggers G and H may be slipped in and out upon the outriggers I and J, so as to bring the rowlocks just the right distance from the boat.

Instead of the pins *k*, lines can be attached to the fore and aft outriggers G and H and passed up through the holes in the ends of the thwart-ship outriggers I and J, and then led inboard, so that when the lines are hauled on the outriggers G and H will be hauled out toward the ends of the outriggers I and J, and other lines can be attached to the outriggers G and H and led directly inboard, so that when they are hauled on, the outriggers G and H will be hauled in toward the boat, thus having the outriggers G and H under perfect control.

The fore and aft outriggers can be used with only one of the thwart-ship outriggers. In that case the thwart-ship outrigger can be midship of the boat instead of at the end, and it may be so attached to the boat as to project only on the side of the boat toward the fore and aft outrigger that is in use when only one of the fore and aft outriggers are used, as the boat can also be used with only one of the fore and aft outriggers.

The lashing X is formed by passing the two ends of the lashing inward through the two holes *d* and *c*. Then haul the lashing through, so as to fetch the bight of the lashing taut upon the outside of the boat; then tie the knot Y upon the inside of the boat; then pass one end of the lashing out through the hole *c* and lead it along outside to the joint *b* and pass it in through the joint *b*; then lead it along inside and pass it out through the hole *e*, and then pass it in through the hole *f*. Then take the other end of the lashing X and pass it out through the joint *b* and lead it along on the outside and pass it in through the hole *e*. Then haul all taut and tie the knot Z firmly upon the inside of the boat, and this will usually be sufficient to prevent the lashing from slipping, so as to let the edges of the boards slip by each other; but, if the nature of the cord requires it, more holes may be bored to pass the lashing through and more turns may be taken through the holes and joint already described, so that it will be impossible for the edges of the boards to slip by each other. The lashing X forms such a hinge that the edges of the boards are held firmly together and cannot slip by each other when the boat is open and ready for use, but when the boat is closed it allows the edges of the boards to separate, so as to allow the different parts of the boat to shut flat together. Toward the ends of the boat, where the flexible boards A, B, E, and F get narrow, after the lashing X has been put into one joint, as between E and F, the ends of the same cord can be led along and the same kind of a lashing put into the joint between the boards F and B, and then led along and used to put the same kind of a lashing between the boards B and A in the joint *g*; thus making three lashings in three different joints with one cord.

The canvas cover is secured to the wooden boat by a sufficient number of the lashings R, which are formed, as is shown in Fig. 17, by passing the two ends of R in through two holes near the upper edge of the canvas cover Q, and also through two corresponding holes in the upper edge of the boards A and E. Then haul taut and tie the knot S upon the inside of the boat. The knots S can be slacked up a little when the boat is closed, and then hauled taut again when the boat is expanded for use, so as to give the canvas cover Q just the right tension. There may be a knot in each end of the lashing R, so that it will slip through the holes in the gunwale of the boat just the right distance when the boat is closed.

At the ends of the boat, instead of the lashings R, a lashing may be carried across the top of the boat from side to side of the canvas cover Q, or a triangular piece of canvas may be sewed to the upper edges of the canvas cover Q, so as to form a deck over the end of the boat. Then when the boat is collapsed or shut up, the boards A and E will shut up inside of the ends of the canvas cover Q without carrying the canvas down in between the boards E and A, as it does at midship, where the lashings R are used.

The whole boat may be decked over with canvas, all except an opening or hatchway, which may have a canvas combing around it. The canvas combing may be held up by props; or a combing may be arranged with boards, so that it will close up the same as the boards that form the body of the boat.

The boards A, B, E, and F may be of such form that A and E form the deck, and B and F form the bottom, of the boat.

The thwart C is a prop to hold the boat open, as well as a seat to sit upon, and its ends rest upon cleats fastened to the sides of the boat A and E.

The cords or straps T are fastened to the sides A and E, and are tied or buckled together on top of the thwart C at the knot U, and hold the thwart C down in place, and also prevent the boat from spreading.

If the boat is long enough to require it, there may be more than one thwart C.

The cord or straps V are attached to the flexible boards B and F, and are buckled or tied together on top of the bottom-board D at the knot W and serve to hold the bottom-board D down in place.

When the boat is composed of only the three flexible boards B, F, and D, then the ends of B and F are lashed or hinged together, and rests $m$ are attached to the lower edges of the side-boards B and F for the bottom-board D to rest upon, and the straps V may be beckets attached to each of the side-boards B and F at or near the lower edges, of such length that they will meet each other on top of the bottom-board D, and by passing a lever or heaver through the two opposite beckets they may be twisted or hove taut, so as to hold the bottom-board D down firmly in place.

When the boat is formed of only three flexible boards, the form of the boards may be different from those shown in the drawings. In fact, the form of the flexible boards may be changed to produce a different model when four or more flexible boards are used, and a boat can be built with only the two flexible boards B and F.

When the boat is built of only two flexible boards B and F, then by having the lower edge of each board the arc of a larger circle than its upper edge, and by decking the boat over with canvas, it will make a good canoe. The thwart C may be jointed so as to go through the hatchway or opening in the deck; but when a boat is built of only three flexible boards, as is shown in Fig. 16, then the false bottom D becomes the real bottom of the boat.

$j$ is a strip of wood or canvas or a rope fastened on lengthwise of the boat outside of the canvas cover Q, at or near the angles, to prevent the canvas cover Q from becoming chafed or worn; or a strip of canvas may be sewed on so as to form a pocket and a strip of wood placed inside of it.

The canvas cover Q is cut the same shape as the flexible boards, only slightly larger, so that when it is sewed together it will fit the boat nicely, as is shown in Fig. 17.

The canvas cover Q may be treated with oil or any other suitable substance to render it water-proof.

I am aware that square-ended folding boats consisting of five or more flat and rigid boards secured together by hinges or other devices and covered with a water-proof covering have before been used, and hence I do not claim a boat of this description; but,

Having thus described my invention, what I claim as my invention, and desire to secure by Letters Patent, is—

1. A folding boat the hull of which consists of two or more flexible boards hinged together, substantially as shown, and adapted when distended to bend and form a sharp-ended boat the sides and bottom of which will be curved from end to end, in combination with a water-proof covering and a thwart or prop for distending and keeping the boat open, all substantially as shown and described.

2. The combination, in a folding boat, of two or more flexible boards of such form that when hinged and distended, as described, they will form a boat whose lines are symmetrical curves lengthwise of the boat, and furnished with rests $m$, secured near the lower edges of two of said boards and extending inward for the bottom-board D to rest upon, and the bottom-board D, adapted to rest upon the rests $m$ and to be held down in place by the straps V, and a water-proof cover Q, suitably secured to said flexible boards, a thwart or prop to hold the boat open, and devices for securing said prop in place, all substantially as set forth.

3. The combination, with a flexible boat, of an outrigger formed of the parts I and J, extending across the boat, and the fore and aft parts G and H, said parts I and J being attached to the boat by the loops L and pins K, and said fore and aft parts being secured to said parts I and J by mortises and pins $k$, substantially as shown and described.

GEORGE W. SCHERMERHORN.

Witnesses:
 OTIS EGAN,
 CHAS. W. WRIGHT.